US007944104B2

(12) United States Patent
Barada et al.

(10) Patent No.: US 7,944,104 B2
(45) Date of Patent: May 17, 2011

(54) MAGNETIC BEARING APPARATUS

(75) Inventors: Toshimitsu Barada, Tokyo (JP);
Toshiya Yoshida, Saitama (JP)

(73) Assignee: Ebara Corporation, Tokyo (JP)

( * ) Notice: Subject to any disclaimer, the term of this patent is extended or adjusted under 35 U.S.C. 154(b) by 328 days.

(21) Appl. No.: 12/359,120

(22) Filed: Jan. 23, 2009

(65) Prior Publication Data
US 2009/0189469 A1   Jul. 30, 2009

(30) Foreign Application Priority Data

Jan. 24, 2008 (JP) ................................ 2008-014275

(51) Int. Cl.
*F16C 32/04* (2006.01)
(52) U.S. Cl. .................... 310/90.5; 361/139; 361/143
(58) Field of Classification Search ............... 310/68 B, 310/90.5, 68 R, 68 C; 361/139, 143; 318/607, 318/608, 638, 652, 653, 599, 811
See application file for complete search history.

(56) References Cited

U.S. PATENT DOCUMENTS

| | | | | |
|---|---|---|---|---|
| 4,841,212 A | * | 6/1989 | Matsushita et al. | 318/607 |
| 5,115,192 A | * | 5/1992 | Bardas et al. | 324/207.12 |
| 5,300,841 A | * | 4/1994 | Preston et al. | 310/90.5 |
| 5,627,421 A | * | 5/1997 | Miller et al. | 310/90.5 |
| 5,666,013 A | * | 9/1997 | Mizuno | 310/90.5 |
| 6,346,757 B1 | * | 2/2002 | Shinozaki | 310/90.5 |
| 6,657,345 B2 | * | 12/2003 | Shinozaki | 310/90.5 |
| 6,984,907 B2 | * | 1/2006 | Barada | 310/90.5 |
| 7,830,056 B2 | * | 11/2010 | Barada et al. | 310/90.5 |
| 2002/0047405 A1 | * | 4/2002 | Shinozaki | 310/90.5 |
| 2009/0189469 A1 | * | 7/2009 | Barada et al. | 310/90.5 |
| 2010/0194225 A1 | * | 8/2010 | Allaire et al. | 310/90.5 |
| 2011/0012456 A1 | * | 1/2011 | Barada et al. | 310/90.5 |

FOREIGN PATENT DOCUMENTS

| | | |
|---|---|---|
| EP | 1903228 A1 | 7/2006 |
| JP | 2004-132537 A | 4/2004 |
| WO | 2007/004656 A1 | 1/2007 |

* cited by examiner

*Primary Examiner* — Quyen Leung
*Assistant Examiner* — David W. Scheuermann
(74) *Attorney, Agent, or Firm* — Westerman, Hattori, Daniels & Adrian, LLP

(57) ABSTRACT

A magnetic bearing apparatus supports a rotating object using magnetic levitation by a magnetic force of electromagnets. The magnetic bearing apparatus includes a PWM driver configured to supply exciting currents to the electromagnets, a driver power source configured to drive the PWM driver, and a displacement error signal removing section configured to extract a displacement error signal of the displacement information from a current flowing through the driver power source and to remove the displacement error signal from the displacement information.

16 Claims, 11 Drawing Sheets

MAGNETIC BEARING APPARATUS

BACKGROUND OF THE INVENTION

1. Field of the Invention

The present invention relates to a magnetic bearing apparatus for supporting a rotating object using magnetic levitation by a magnetic force of electromagnets, and more particularly to a magnetic bearing apparatus capable of accurately detecting a displacement of the rotating object based on a change in impedance of the electromagnets.

2. Description of the Related Art

A magnetic bearing apparatus has been widely used in a rotary machine, such as a turbo molecular pump, that necessarily has a high-speed rotating object. The magnetic bearing apparatus supports the rotating object by a magnetic force without physical contact. This magnetic bearing apparatus has several advantages including low friction in rotation of the rotating object, no wear particles, no need for maintenance as a result of wear of bearings, and no contamination due to a lubricant for bearings.

In the magnetic bearing apparatus, there have recently been growing needs for lower cost, smaller installation space, and an ability of higher-rotation. Under such circumstances, a technique of sensorless magnetic bearing has been employed in the magnetic bearing apparatus. The sensorless magnetic bearing detects a displacement of the rotating object without using a displacement sensor. The techniques of detecting the displacement of the rotating object include a technique using a change in impedance of the electromagnets, instead of the displacement sensor.

The impedance of the electromagnet is mainly composed of inductance elements of the electromagnet, and a change in this inductance is used for detecting the displacement of the rotating object. The inductance of the electromagnet depends mainly on a material and a shape of a core of the electromagnet, the number of turns of a coil, and a gap between the rotating object and the electromagnet. The material and the shape of the core and the number of turns of the coil are established at a stage of designing the electromagnet. Therefore, the change in inductance of the electromagnet is caused by a change in the gap between the rotating object and the electromagnet. In other words, the displacement of the rotating object causes a change in inductance of the electromagnet, and the detection of the displacement of the rotating object is realized by obtaining the change in the inductance. A displacement signal obtained is fed back, so that the rotating object can be supported by the magnetic levitation at a predetermined position without physical contact.

However, as an exciting current of the electromagnet varies, an electromagnetic characteristic of the core is actually changed. In other words, while the rotating object is not displaced, the inductance of the electromagnet is changed as a result of the change in the exciting current. Therefore, in this displacement detection based on the change in the inductance, the exiting current of the electromagnet produces a displacement detection error.

The electromagnet applies an external force to the rotating object when supporting it. Generally, a force generated by a low-frequency exciting current causes a small displacement of the rotating object, and on the other hand a force generated by a high-frequency exciting current causes a large displacement of the rotating object. Therefore, when supplying the low-frequency exciting current to the electromagnet, the displacement of the rotating object makes a greater change in inductance than that due to the change in the exciting current. In this case, the displacement detection error due to the exiting current has a small influence. To the contrary, when supplying the high-frequency exciting current to the electromagnet, the change in the exciting current makes a greater change in inductance than that due to the displacement of the rotating object. In this case, the displacement detection error has a great influence. As a result, controlling of the electromagnet bearing tends to be unstable in the high-frequency range.

Japanese laid-open patent publications No. 2004-132537 and No. 2005-196635 disclose solutions for preventing the unstable controlling of the electromagnet bearing in the high-frequency range. FIG. 10 is a view showing an electromagnetic bearing apparatus disclosed in the patent publication No. 2004-132537. A pair of electromagnets 502 and 503 are provided so as to interpose a magnetic rotating object 501 therebetween. The rotating object 501 is levitated and supported by a magnetic force generated by the electromagnets 502 and 503 at a desired position between the electromagnets 502 and 503 with no physical contact. A PWM-type driver 504 is used to supply exciting currents to the electromagnets 502 and 503. More specifically, opposing PWM voltages are applied to the electromagnets 502 and 503.

Current detectors 511 and 512 are provided for detecting the exciting currents flowing through the electromagnets 502 and 503. The detected current signals are added in an adder 505, and the resultant signal is inputted to a detection circuit 507, where the displacement information about the rotating object 501 is obtained. However, this displacement information includes the above-mentioned displacement detection error caused by the exciting currents of the electromagnets. To eliminate the displacement detection error from the displacement information, a subtractor 506 subtracts the current signals detected by the current detectors 511 and 512. The resultant signal is multiplied by a coefficient in a calculating circuit 508. The resultant signal obtained in the calculating circuit 508 is a signal corresponding to the above-mentioned displacement detection error caused by the exciting currents of the electromagnets 502 and 503. In an adder 509, the signal, representing the displacement detection error, is added to (or subtracted from) the displacement information obtained from the detection circuit 507, whereby the displacement detection error is removed from the displacement information.

An output signal from the adder 509, which contains no displacement detection error, is fed back to a controller 510. This controller 510 outputs a command signal to the driver 504 so as to cause the driver 504 to pass the exciting currents through the electromagnets 502 and 503 for supporting the rotating object 501 at a predetermined position. In this manner, the rotating object 501 is levitated by the magnetic force without physical contact.

FIG. 11 is a view showing an electromagnetic bearing apparatus disclosed in the patent publication No. 2005-196635. A pair of electromagnets 602 and 603 are provided so as to interpose a magnetic rotating object 601 therebetween. The rotating object 601 is levitated and supported by a magnetic force generated by the electromagnets 602 and 603 at a desired position between the electromagnets 602 and 603 with no physical contact. A PWM-type driver 604 is used to supply exciting currents to the electromagnets 602 and 603. More specifically, opposing PWM voltages are applied to the electromagnets 602 and 603.

Current detectors 610 and 611 are provided so as to detect the exciting currents flowing through the electromagnets 602 and 603. The detected current signals are added in an adder 605. An output signal of the adder 605 is an AM modulated wave signal containing a displacement information of the rotating object 601. This signal also contains the displacement detection error caused by the exciting currents of the electromagnets 602 and 603, as well as the previously-described example. To eliminate the displacement detection error from the output signal of the adder 605, an input signal of the driver 604 is filtered through a filter 608, and the resultant signal is modulated by an AM modulator 612. A subtractor 606 subtracts the modulated signal from the output signal of the adder 605.

The input signal of the driver 604 is a command signal for passing the currents through the electromagnets 602 and 603. Therefore, the input signal of the driver 604 can be used as an exciting current signal of the electromagnets 602 and 603. In other words, the input signal of the driver 604 itself can be used as a signal corresponding to the displacement detection error caused by passing the exciting currents through the electromagnets 602 and 603. However, an attenuation and a phase delay occur between when the input signal of the driver 604 commands so as to pass the currents through the electromagnets 602 and 603 and when the currents actually flow through the electromagnets 602 and 603, due to a frequency characteristic (transfer characteristic) determined from the driver 604 and the electromagnets 602 and 603. Therefore, from a standpoint of the input signal of the driver 604, these attenuation and phase delay also result in an attenuation and a phase delay in the output signal from the adder 605 obtained from the exciting current information of the electromagnets 602 and 603, i.e., the displacement information signal containing the displacement detection error, as well.

Generally, the frequency characteristic determined from the driver 604 and the electromagnets 602 and 603 is in a low degree. Therefore, a simple realization is easy. Thus, a filtering characteristic of the filter 608 is set to be equal to the frequency characteristic determined from the driver 604 and the electromagnets 602 and 603, and the input signal of the driver 604 (i.e., the signal corresponding to the displacement detection error) is filtered through the filter 608 and is modulated by the AM modulator 612. With this processing, the frequency characteristic of the output signal from the adder 605 and the frequency characteristic of the output signal from the AM modulator 612, from the standpoint of the input signal of the driver 604, can be matched to each other. Then, the subtractor 606 removes the displacement detection error from the displacement information by the subtraction.

The output signal from the subtractor 606 is an AM modulated signal of the displacement information signal from which the displacement detection error has been removed. Therefore, the output signal from the subtractor 606 is demodulated by a demodulator 607, so that a displacement signal is obtained. This displacement signal is fed back and compared with a target levitation position signal. A signal, generated based on the comparison with the target levitation position signal, is inputted into a compensator 609. In this manner, the rotating object 601 is supported stably by the magnetic levitation at a predetermined position.

However, in the magnetic bearing apparatus as disclosed in the Japanese laid-open patent publication No. 2004-132537, an attenuation and a phase delay occur in the displacement information obtained from the detection circuit 507 in accordance with the frequency of the displacement information, due to the frequency characteristic (i.e., transfer characteristic) of the detection circuit 507 itself. To closely remove the displacement detection error, it is necessary to cause an attenuation and a phase delay in the displacement detection error signal by the same amount of the detection circuit 507, so that the characteristics of the displacement information and the displacement detection error signal are matched to each other before they are added (or subtracted) in the adder 509. In other words, the calculator 508 is required to behave as a filter having a frequency characteristic equal to that of the detection circuit 507. However, a degree of the frequency characteristic of the detection circuit 507 is high, and it is difficult that the calculator 508 has the same filtering characteristic as that of the detection circuit 507. It is therefore difficult to accurately remove the displacement detection error, particularly in the high-frequency range.

In the magnetic bearing apparatus as disclosed in the Japanese laid-open patent publication No. 2005-196635, a degree of the frequency characteristic of the filter 608 is low. However, it is impossible to completely match the frequency characteristic of the filter 608 to the frequency characteristic (i.e., transfer characteristic) determined from the driver 604 and the electromagnets 602 and 603. As a result, it is difficult to realize more accurate displacement detection. Further, it takes a certain time to measure the frequency characteristic (i.e., transfer characteristic) of the driver 604 and the electromagnets 602 and 603 and to match the frequency characteristic of the filter 608 to the measured frequency characteristic.

SUMMARY OF THE INVENTION

The present invention has been made in view of the above drawbacks. It is therefore an object of the present invention to provide a magnetic bearing apparatus capable of accurately detecting a displacement of a rotating object even in a high-frequency range and capable of realizing a stable magnetic bearing control in a wide frequency range including the high-frequency range.

One aspect of the present invention for achieving the above object is to provide a magnetic bearing apparatus having electromagnets for rotatably supporting a rotor at a predetermined position by a magnet levitation, while obtaining a displacement information on the rotor based on a change in impedances of the electromagnets. The magnetic bearing apparatus includes: a PWM driver configured to supply exciting currents to the electromagnets, the PWM driver being driven at a predetermined carrier frequency; a driver power source configured to drive the PWM driver; and a displacement error signal removing section configured to extract a displacement error signal of the displacement information from a current flowing through the driver power source and to remove the displacement error signal from the displacement information.

The current component flowing through the driver power source is the exciting current components supplied to the electromagnets, i.e., the displacement error information component of the displacement information. In view of this fact, the displacement error information of the displacement information is extracted from the current flowing through the driver power source and the displacement error information is removed from the displacement information. Therefore, no filter is required for estimating a displacement detection error, and the displacement detection error, caused by the exciting currents of the electromagnets, can be directly removed even in a high-frequency range. Accordingly, there is no need to match the filtering characteristics to each other, and the rotor can be stably supported by the magnetic levitation even in the high-frequency range. Moreover, since no filter is needed, the cost of the magnetic bearing apparatus can be low.

In a preferred aspect of the present invention, the displacement error signal removing section includes a first demodulator configured to demodulate ripple current components of the exciting currents into AM modulated waves each having a frequency equal to a carrier frequency of the PWM driver, a second demodulator configured to demodulate a current component, flowing through the driver power source, into an AM modulated wave having a frequency equal to the carrier frequency of the PWM driver, a first gain adjustor configured to adjust gains of the ripple current components before or after the first demodulator demodulates the ripple current components, a second gain adjustor configured to adjust a gain of the current component flowing through the driver power source before or after the second demodulator demodulates the current component, and a subtractor configured to subtract the current component obtained through the second demodulator and the second gain adjustor from the ripple current components obtained through the first demodulator and the first gain adjustor.

The ripple current components, generated by application of PWM voltages to the electromagnets, and the current component flowing through the driver power source are current components each having a frequency equal to a carrier frequency of the PWM driver. The ripple current components are the displacement information components containing the displacement error information, and the current component flowing through the driver power source is the displacement error information. Therefore, the displacement information signal and the displacement error information signal can be extracted by the first and second demodulators. Further, since the first and second gain adjustors are arranged upstream or downstream of the first and second demodulators, the gains of the ripple currents and the gain of the current flowing through the driver power source can be adjusted. Moreover, the displacement error information can be removed from the displacement information by subtracting the displacement error information signal obtained through the second demodulator and the second gain adjustor from the displacement information signal obtained through the first demodulator and the first gain adjustor.

In a preferred aspect of the present invention, the first demodulator and the second demodulator are of synchronous detection type; and adjustment of the gains by the first gain adjustor and the second gains adjustor are performed by shifting a timing of synchronous detection.

According to the present invention, the gain adjustment can be performed by shifting of the synchronous detection, and as a result there is no need to provide an amplifier for adjusting the gains.

In a preferred aspect of the present invention, the first gain adjustor and the second gain adjustor are configured to adjust the gains of the ripple current components and the gain of the current component, flowing through the driver power source, such that an output of the subtractor is zero when the displacement of the rotor is zero.

According to the present invention, the error information of the displacement can be easily adjusted to be zero no matter what magnitude the exciting currents have.

In a preferred aspect of the present invention, the displacement error signal removing section includes a first gain adjustor configured to adjust gains of ripple current components of the exciting currents, a second gain adjustor configured to adjust a gain of the current component flowing through the driver power source, a subtractor configured to subtract the current component obtained from the second gain adjustor from the ripple current components obtained from the first gain adjustor, and a demodulator configured to demodulate a signal, obtained from the subtractor, into an AM modulated wave having a frequency equal to a carrier frequency of the PWM driver.

According to the present invention, the subtractor is arranged upstream of the demodulator, and the current component whose gain is adjusted by the second gain adjustor is subtracted from the ripple current components whose gains are adjusted by the first gain adjustor. Therefore, there is no need to provide multiple demodulators. As a result, the apparatus can be simple.

In a preferred aspect of the present invention, the displacement error signal removing section includes a transformer having a first coil into which ripple current components of the exciting currents are inputted and a second coil into which a current component, flowing through the driver power source, is inputted, and a demodulator configured to demodulate an output signal from the transformer into an AM modulated wave having a frequency equal to a carrier frequency of the PWM driver. The transformer is configured to adjust gains of the ripple current components and a gain of the current component, flowing through the driver power source, by adjusting a turns ratio of the first coil to the second coil and further configured to subtract the current component, flowing through the driver power source, from the ripple current components by electromagnetic induction.

According to the present invention, the transformer can function as a gain adjustor and a subtractor. Therefore, the apparatus can be simple. Further, the input of the ripple current components and the input of the current component, flowing through the driver power source, can be electrically isolated from an output side in the transformer. Therefore, the displacement information can be delivered to a low-voltage circuit as it is. A condenser or a combination of a condenser and a resistor may be connected in parallel between output-terminals of the coils of the transformer. In this case, a resonant circuit can be constituted by the output-side coil of the transformer and the condenser, and a filter for removing frequencies, other than a frequency contained in the displacement information, can also be constituted.

In a preferred aspect of the present invention, the demodulator is of synchronous detection type; and a timing of synchronous detection of the demodulator is shifted such that an output of the subtractor is zero when the displacement of the rotor is zero.

According to the present invention, the error information of the displacement can be easily adjusted to be zero no matter what magnitude the exciting currents have.

Another aspect of the present invention is to provide a magnetic bearing apparatus having electromagnets for rotatably supporting a rotor at a predetermined position by a magnet levitation, while obtaining a displacement information on the rotor based on a change in impedances of the electromagnets. The magnetic bearing apparatus includes: a PWM driver configured to supply exciting currents to the electromagnets, the PWM driver being driven at a predetermined carrier frequency and having a bias power source configured to supply a bias current to the electromagnets for linearizing a relationship between the exciting currents supplied to the electromagnets and magnetic forces exerted on the rotor; and a displacement error signal removing section configured to extract a displacement error signal of the displacement information from a current flowing through the bias power source and to remove the displacement error signal from the displacement information.

The alternating current component flowing through the bias power source is the exciting current components supplied to the electromagnets, i.e., the displacement error information component of the displacement information. In view of this fact, the displacement error information of the displacement information is extracted directly from the alternating current flowing through the bias power source and the displacement error information is removed from the displacement information. Therefore, no filter is required for estimating a displacement detection error, and the displacement detection error, caused by the exciting currents of the electromagnets, can be directly removed even in a high-frequency range. Accordingly, there is no need to match the filtering characteristics to each other, and the rotor can be stably supported by the magnetic levitation even in the high-frequency range. Moreover, since no filter is needed, the cost of the magnetic bearing apparatus can be low.

In a preferred aspect of the present invention, the displacement error signal removing section includes a first demodulator configured to demodulate ripple current components of the exciting currents into AM modulated waves each having a frequency equal to a carrier frequency of the PWM driver, a second demodulator configured to demodulate a current component, flowing through the bias power source, into an AM modulated wave having a frequency equal to the carrier frequency of the PWM driver, a first gain adjustor configured to adjust gains of the ripple current components before or after the first demodulator demodulates the ripple current components, a second gain adjustor configured to adjust a gain of the current component flowing through the bias power source before or after the second demodulator demodulates the current component, and a subtractor configured to subtract the current component obtained through the second demodulator and the second gain adjustor from the ripple current components obtained through the first demodulator and the first gain adjustor.

The ripple current components, generated by application of PWM voltages to the electromagnets, and the current component flowing through the bias power source are current components each having a frequency equal to a carrier frequency of the PWM driver. The ripple current components are the displacement information components containing the displacement error information, and an alternating current component of the current flowing through the bias power source is the displacement error information component. Therefore, the displacement information signal and the displacement error information signal can be extracted by the first and second demodulators. Further, since the first and second gain adjustors are arranged upstream or downstream of the first and second demodulators, the gains of the ripple currents and the gain of the current flowing through the bias power source can be adjusted. Moreover, the displacement error information can be removed from the displacement information by subtracting the displacement error information signal obtained through the second demodulator and the second gain adjustor from the displacement information signal obtained through the first demodulator and the first gain adjustor.

In a preferred aspect of the present invention, the displacement error signal removing section includes a first gain adjustor configured to adjust gains of ripple current components of the exciting currents, a second gain adjustor configured to adjust a gain of the current component flowing through the bias power source, a subtractor configured to subtract the current component obtained from the second gain adjustor from the ripple current components obtained from the first gain adjustor, and a demodulator configured to demodulate a signal, obtained from the subtractor, into an AM modulated wave having a frequency equal to a carrier frequency of the PWM driver.

According to the present invention, the subtractor is arranged upstream of the demodulator, and the current component obtained from the second gain adjustor is subtracted from the ripple current components obtained from the first gain adjustor. Therefore, there is no need to provide multiple demodulators. As a result, the apparatus can be simple.

In a preferred aspect of the present invention, the first demodulator and the second demodulator are of synchronous detection type; and adjustment of the gains by the first gain adjustor and the second gains adjustor are performed by shifting a timing of synchronous detection.

In a preferred aspect of the present invention, the first gain adjustor and the second gain adjustor are configured to adjust the gains of the ripple current components and the gain of the current component, flowing through the bias power source, such that an output of the subtractor is zero when the displacement of the rotor is zero.

In a preferred aspect of the present invention, the displacement error signal removing section includes a transformer having a first coil into which ripple current components of the exciting currents are inputted and a second coil into which a current component, flowing through the bias power source, is inputted, and a demodulator configured to demodulate an output signal from the transformer into an AM modulated wave having a frequency equal to a carrier frequency of the PWM driver. The transformer is configured to adjust gains of the ripple current components and a gain of the current component, flowing through the bias power source, by adjusting a turns ratio of the first coil to the second coil and further configured to subtract the current component, flowing through the bias power source, from the ripple current components by electromagnetic induction.

According to the present invention, the transformer can function as a gain adjustor and a subtractor. Therefore, the apparatus can be simple. Further, the input of the ripple current components and the input of the current component, flowing through the bias power source, can be electrically isolated from an output side in the transformer. Therefore, the displacement information can be delivered to a low-voltage circuit as it is. A condenser or a combination of a condenser and a resistor may be connected in parallel between output-terminals of the coils of the transformer. In this case, a resonant circuit can be constituted by the output-side coil of the transformer and the condenser, and a filter for removing frequencies, other than a frequency contained in the displacement information, can also be constituted. Moreover, the current, flowing through the bias power source, is smaller than the current flowing through the driver power source, and the transformer is unlikely to reach magnetic saturation. Therefore, the transformer itself can be compact.

DETAILED DESCRIPTION OF THE PREFERRED EMBODIMENTS

Embodiments of the present invention will be described below with reference to the drawings.

First Embodiment

Figure 1:
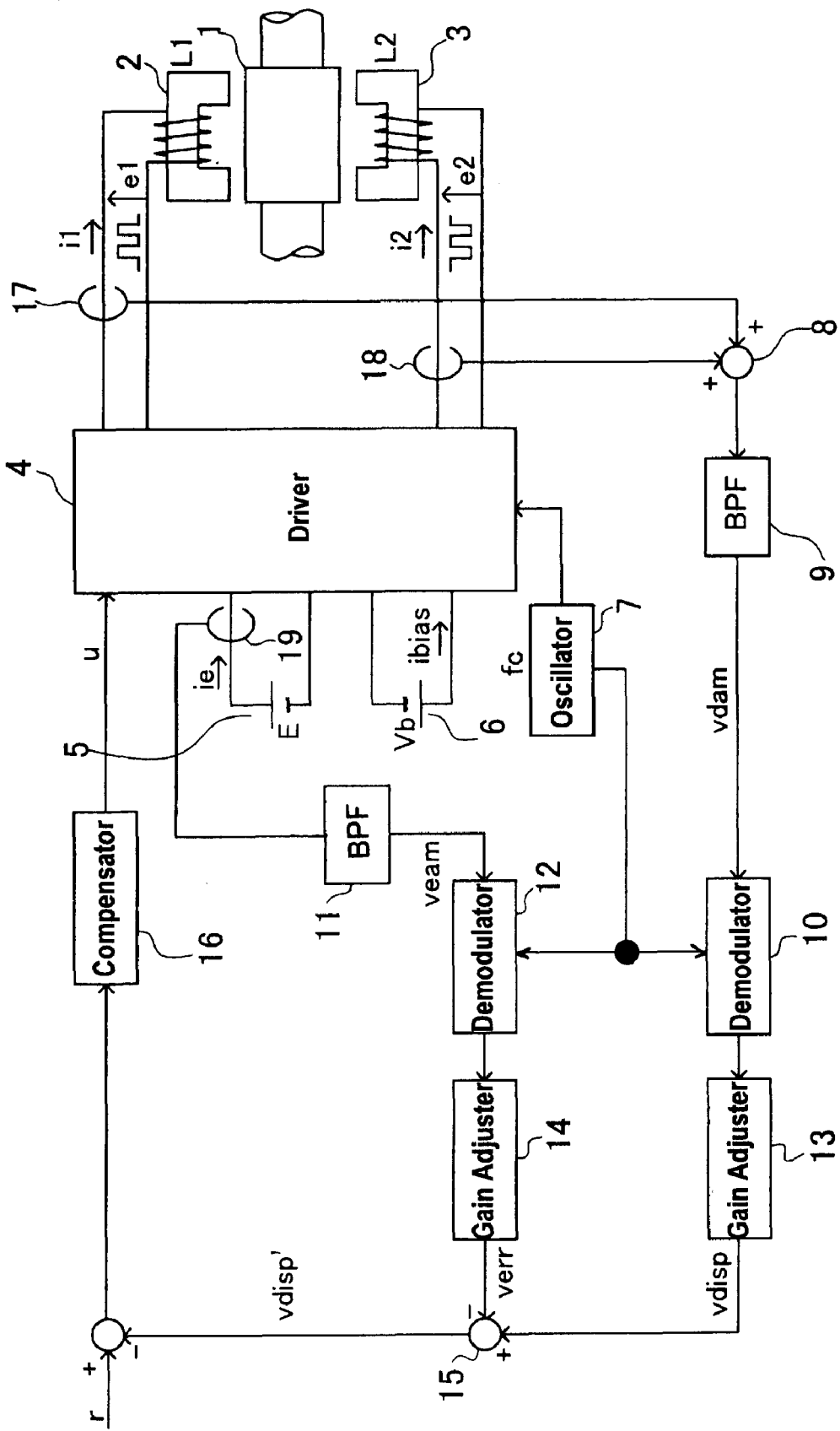
FIG. 1 is a view showing a structural example of a magnetic bearing apparatus according to a first embodiment of the present invention.

A first embodiment of the present invention will be described based on FIG. 1 through FIG. 4. FIG. 1 is a view showing a structural example of a magnetic bearing apparatus according to the first embodiment of the present invention. In FIG. 1, reference numeral 1 represents a rotating object (i.e., rotor) made of a magnetic material. A pair of electromagnets 2 and 3 are provided so as to interpose the rotor 1 therebetween. These electromagnets 2 and 3 are provided for supporting the rotor 1 by magnetic levitation without physical contact. The electromagnets 2 and 3 are capable of supporting one degree of freedom of the rotor 1. Although it is preferable to prepare a drawing showing a state in which five degrees of freedom of the rotor 1, other than a rotational direction around an axis of the rotor 1, are supported by the magnetic levitation using plural pairs of electromagnets, the attached drawings only show one degree of freedom for the reasons of simplifying the description. In addition, a motor for rotating the rotor 1 is not shown in the drawings, and only the magnetic bearing will be described.

A driver 4 is a PWM (pulse width modulation) driver configured to supply exciting currents i1 and i2 to the electromagnets 2 and 3. This driver 4 supplies the exciting currents i1 and i2 to the electromagnets 2 and 3 by applying PWM voltages e1 and e2 to the electromagnets 2 and 3. A carrier frequency for the PWM voltages e1 and e2 is a frequency fc generated by an oscillator 7. The driver 4 is coupled to a driver power source 5 configured to produce a PWM drive voltage E, and also coupled to a bias power source 6 configured to generate a bias voltage Vb. Application of this bias voltage Vb supplies a bias current ib, which is a direct current, to the electromagnets 2 and 3. This bias current ib can linearize a relationship between the exciting currents supplied to the electromagnets 2 and 3 and magnetic forces exerted on the rotor 1.

Figure 2:
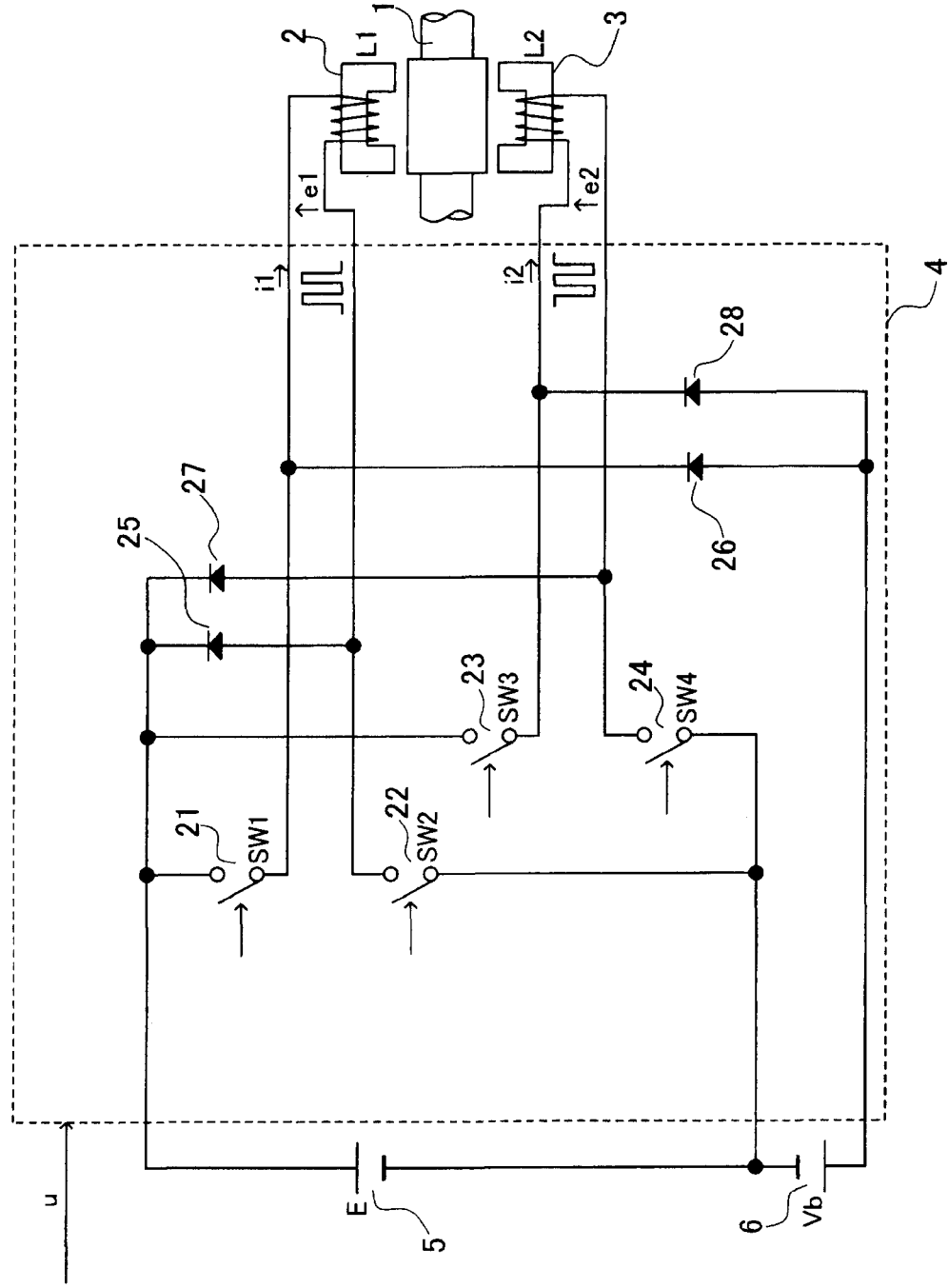
FIG. 2 is a view showing a structural example of a PWM drive section of a driver in the magnetic bearing apparatus shown in FIG. 1.

FIG. 2 is a view showing a structural example of a PWM drive section of the driver 4. The driver 4 is configured to control a duty of PWM based on a control signal u outputted from a compensator 16 (see FIG. 1) which is provided for stabilizing magnetic levitation control. The driver 4 supplies a desired control current ic to the electromagnets 2 and 3 in such a manner that the control current ic is superimposed on the bias current ib. The PWM voltages e1 and e2 to be applied to the electromagnets 2 and 3 are controlled such that duty ratios thereof are opposite to each other. For example, when the control current to the electromagnet 2 is ib+ic, the control current to the electromagnet 3 is ib−ic. More specifically, when a switching element 21 (SW1) and a switching element 22 (SW2) are ON, a switching element 23 (SW3) and a switching element 24 (SW4) are turned OFF. In this case, while the voltage E is applied to the electromagnet 2 by the driver power source 5, a current flows such that an energy stored in an electromagnet coil of the electromagnet 3 is returned to the driver power source 5 via the bias power source 6 and fly-wheel diodes 27 and 28.

Similarly, when the switching element 21 (SW1) and the switching element 22 (SW2) are OFF, the switching element 23 (SW3) and the switching element 24 (SW4) are turned ON. In this case, while a current flows such that an energy stored in an electromagnet coil of the electromagnet 2 is returned to the driver power source 5 via the bias power source 6 and fly-wheel diodes 25 and 26, the voltage E is applied to the electromagnet 3 by the driver power source 5.

If the voltage E of the driver power source 5 is sufficiently larger than a value given by multiplying the control current ic by direct current resistances of the electromagnets 2 and 3, the duty of the PWM voltages e1 and e2 is substantially 50% ON duty When the switching elements 21, 22, 23, and 24 are ON, the voltage E is applied to the electromagnets 2 and 3. On the other hand, when the switching elements 21, 22, 23, and 24 are OFF, the voltage −E+Vb is applied to the electromagnets 2 and 3. As a result, average currents of the exciting currents i1 and i2 to the electromagnets 2 and 3 are ib+ic and ib−ic, respectively. Ripple currents ir1 and ir2, which are generated by the PWM voltages e1 and e2, are superimposed on the average currents ib+ic and ib−ic.

When the PWM voltages e1 and e2 are applied to the electromagnets 2 and 3, currents flow in accordance with impedances of the electromagnets 2 and 3. Since the voltages e1 and e2 have the high frequency fc, the impedances of the electromagnets 2 and 3 can be regard as inductances. Therefore, the ripple currents ir1 and ir2 have magnitudes corresponding to values of the inductances L1 and L2 of the electromagnets 2 and 3, respectively, and are generated in inverse proportion to the magnitudes of the inductances L1 and L2.

Since the PWM voltages e1 and e2 are controlled such that the duty ratios thereof are opposite to each other, the ripple currents ir1 and ir2 exhibit amplitudes undulating upwardly and downwardly in directions opposite to each other. Because the inductances L1 and L2 of the electromagnets 2 and 3 vary in accordance with the displacement of the rotor 1, the ripple currents ir1 and ir2, which vary in accordance with the inductances L1 and L2, contain a displacement information of the rotor 1. By extracting and feeding back the displacement information, the rotor 1 can be supported by magnetic levitation at a predetermined position.

Figure 3:
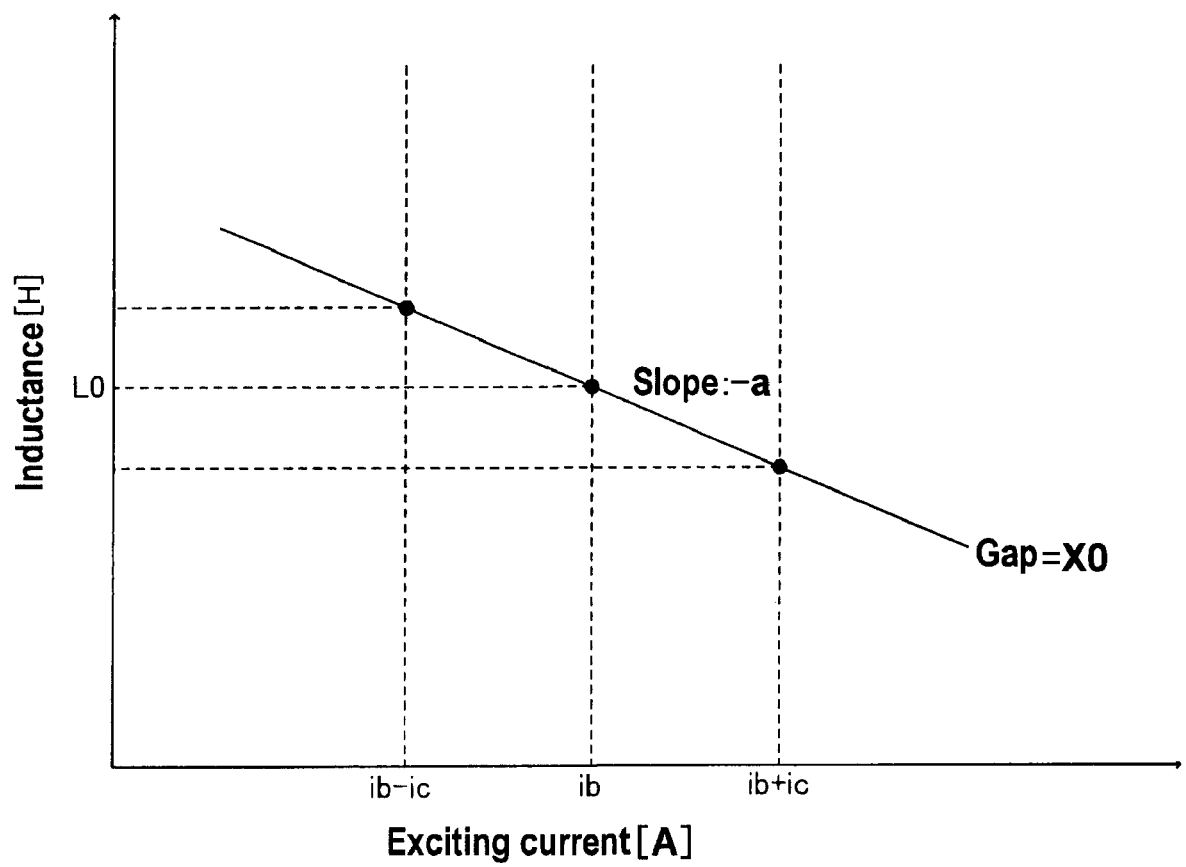
FIG. 3 is graph showing a relationship between an exciting current of an electromagnet and an inductance.

However, the inductances L1 and L2 of the electromagnets 2 and 3 vary depending not only on the displacement of the rotor 1, but also on the exciting currents i1 and i2. This is because magnetic properties of the electromagnets 2 and 3 vary depending on the exciting currents. An increase in the exciting current to the electromagnet results in a decrease in the inductance in substantially proportion to the exciting current, as shown in FIG. 3. In FIG. 3, a symbol X0 represents a gap between the rotor 1 and the electromagnets 2 and 3 and a symbol L0 represents the inductance, when the rotor 1 is in a center between the electromagnet 2 and the electromagnet 3. A symbol "−a" represents an inclination indicating the decrease in the inductance as a result of the increase in the exciting current to the electromagnet. Even if the rotor 1 is fixed to the gap X0, i.e., even if the rotor 1 is not displaced, the inductances L1 and L2 show different values when the exciting currents ib+ic and ib−ic flow through the electromagnets 2 and 3. This fact is the cause of displacement error information contained in the displacement information extracted from the ripple currents ir1 and ir2.

Figure 4:
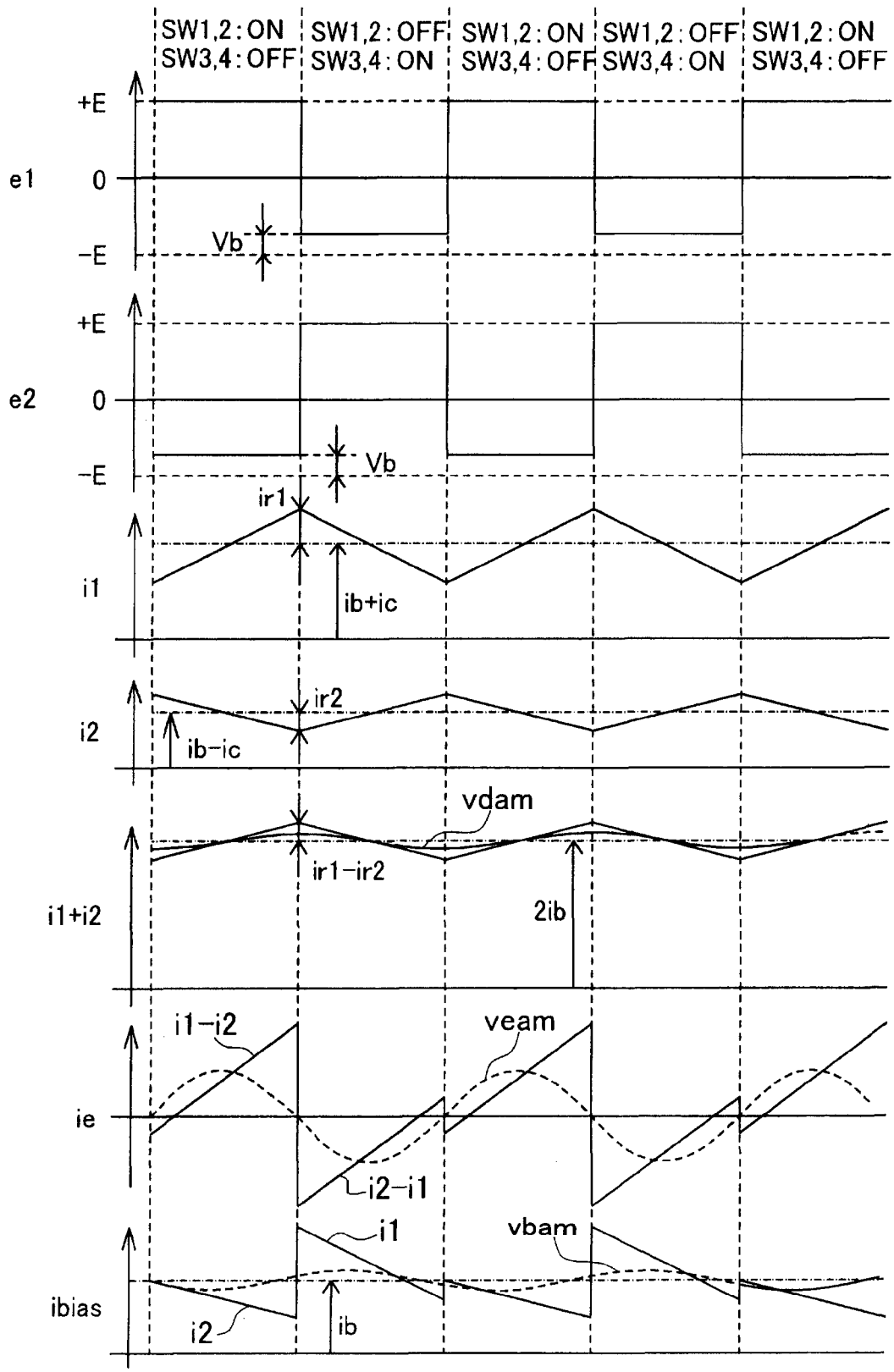
FIG. 4 is a diagram showing signals of respective sections when a displacement of a rotor is zero in the magnetic bearing apparatus shown in FIG. 1.

In order to obtain an accurate displacement information on the rotor 1, it is necessary to remove the displacement error information from the displacement information extracted from the ripple currents ir1 and ir2. The inclination "a" is given in advance from calculation or actual measurement. FIG. 4 shows signals (e.g., the PWM voltages e1 and e2, the exciting currents i1, i2, i1+i2, the current ie from the driver power source, the current ibas from the bias power source), where the displacement of the rotor 1 is zero (i.e., the gap is X0) and the exciting currents i1 and i2 of the electromagnets 2 and 3 are ib+ic and ib−ic, respectively. Even when the displacement of the rotor 1 is zero, the relationship between the inductances L1 and L2 is L1<L2, due to the control current ic, in accordance with the characteristics as shown in FIG. 3. Therefore, as shown in FIG. 4, the relationship between the ripple currents ir1 and ir2 is ir1>ir2, as if the rotor 1 is displaced.

In this embodiment, an accurate displacement information is obtained in accordance with the following method.

First, a method of extracting the displacement information will be described with reference to FIG. 1.

The exciting currents i1 and i2 of the electromagnets 2 and 3 are detected by current detectors 17 and 18 which are a current sensor (e.g., a current transformer) or a shunt resistance. The detection signals are added by an adder 8. The resultant signal from the adder 8 is filtered through a bandpass filter 9 whose central frequency is the carrier frequency fc. The bandpass filter 9 removes a direct current component from the signal, whereby a vdam signal is obtained. This vdam signal is an AM modulated signal to which the displacement information is carried, and the displacement information contains a displacement error information generated by the supply of the control current ic. A magnitude of this displacement error information is proportional to the magnitude of the control current ic.

The above-described vdam signal is demodulated by a demodulator 10 into a signal of a carrier wave having a frequency equal to the carrier frequency fc. The resultant signal is sent to a gain adjustor 13 and adjusted by the gain adjustor 13 to have a desired gain (amplitude), whereby a vdisp signal is obtained. This vdisp signal is a displacement information signal containing the displacement error information.

Next, a method of extracting the displacement error information will be described. As shown in FIG. 4, the value of the current ie, flowing from the driver power source 5 to the driver 4, is i1−i2 when the switching element 21 (SW1) and the switching element 22 (SW2) are ON and the switching element 23 (SW3) and the switching element 24 (SW4) are OFF. On the other hand, when the switching element 21 (SW1) and the switching element 22 (SW2) are OFF and the switching element 23 (SW3) and the switching element 24 (SW4) are ON, the value of the current ie is i2−i1. This current ie is detected by a current detector 19 which is a current sensor (e.g., a current transformer) or a shunt resistance. The detection signal is filtered through a bandpass filter 11 whose central frequency is the carrier frequency fc, so that a fundamental wave component is extracted. The bandpass filter 11 outputs a veam signal.

The above-mentioned veam signal is an AM modulated signal, and has a magnitude determined only from the control current ic, regardless of the magnitude of the ripple currents ir1 and ir2, i.e., regardless of the displacement of the rotor 1. In other words, the amplitude of the veam signal is proportional to the magnitude of the control current ic. Therefore, the veam signal contains the displacement error information generated by the control current ic. This veam signal is demodulated by a demodulator 12 into a signal of a carrier wave having a frequency equal to the carrier frequency fc. The resultant signal is sent to a gain adjustor 14 and adjusted by the gain adjustor 14 to have a desired gain (amplitude), whereby a verr signal, which is a displacement error information signal, is obtained. The gain adjustor 13 may be arranged upstream of the demodulator 10, and the gain adjustor 14 may be arranged upstream of the demodulator 12.

To eliminate the displacement error information, a subtractor 15 subtracts the verr signal from the vdisp signal to thereby obtain a true displacement signal vdisp'. Then, the displacement of the rotor 1 is fixed to zero (the gap X0), and the predetermined control current ic is supplied. In this state, the gain of the gain adjustor 13 or the gain adjustor 14 is adjusted such that the vdisp signal and the verr signal are equal to each other. In this manner, the displacement error signal, generated by the supply of the control current ic, is completely removed, and the true displacement signal vdisp', which is generated as a result of the displacement of the rotor 1, is obtained.

Between the vdisp signal and the verr signal, there are no time delay and no difference in frequency characteristic. Therefore, the vdisp signal and the verr signal can be detected at the same time. Accordingly, by subtracting the verr signal from the vdisp signal in the subtractor 15, the true displacement information containing no displacement error information can be obtained without using a complex filter as required in the Japanese laid-open patent publications No. 2004-132537 and No. 2005-196635. The true displacement signal vdisp' obtained in this manner is fed back and compared with a target levitation position r. A difference signal obtained by the comparison is processed by a compensator 16. The resultant control signal u from the compensator 16 is inputted to the driver 4, so that the rotor 1 is stably supported by the magnetic levitation at a predetermined position between the electromagnet 2 and the electromagnet 3.

In the above-described example, the gain adjustment in the gain adjustor 13 or the gain adjustor 14 is performed while the displacement of the rotor 1 is kept zero. However, the gain adjustment in the gain adjustor 13 or the gain adjustor 14 may be performed while the displacement of the rotor 1 is not zero, e.g., while the rotor 1 is in a preferable position. Further, the demodulators 10 and 12 may be of synchronous detection type. In a case of using the synchronous detection type, the gain adjustment of the vdisp signal and the verr signal can be performed by shifting a detection timing (i.e., phase-shifting). Therefore, the synchronous-detection-type demodulators may be used instead of the gain adjustor 13 and the gain adjustor 14

As shown in FIG. 4, a phase of the veam signal precedes a phase of the vdam signal by 90 degrees. Utilizing this phase difference, the detection timings of the demodulator 10 and the demodulator 12 may be changed (shifted) by a common phase shifter so that the gain of the vdisp signal and the gain of the verr signal are adjusted simultaneously. For example, on the one hand the gain of the vdisp signal is increased and on the other hand the gain of the verr signal is decreased, or on the one hand the gain of the vdisp signal is decreased and on the other hand the gain of the verr signal is increased.

The adder 8 and the bandpass filter 9 shown in FIG. 1 may be replaced with a transformer (not shown in the drawings). In this case, the detection signals of the current detectors 17 and 18 can be added by an electromagnet induction, and the direct current component can be removed.

Second Embodiment

Figure 5:
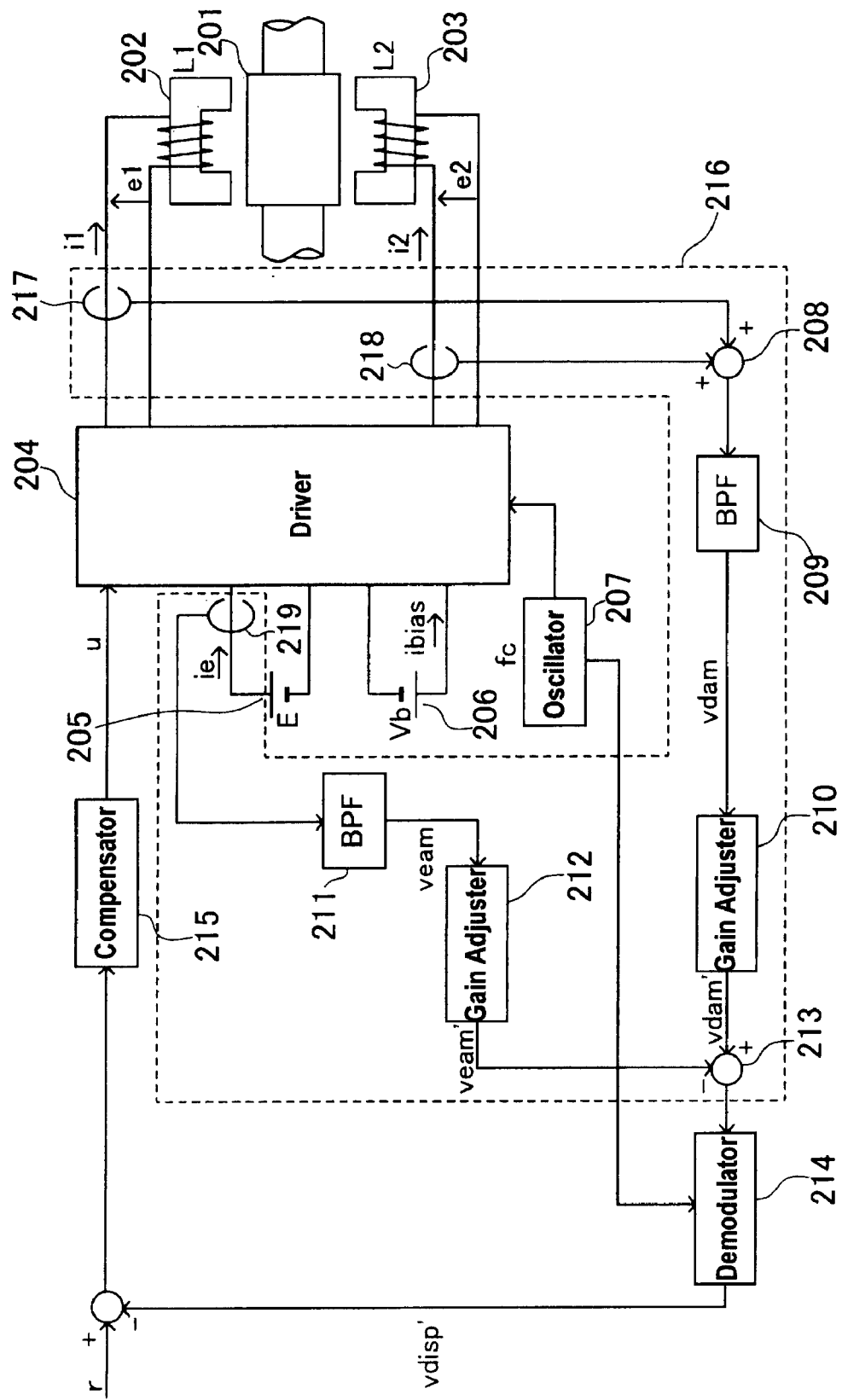
FIG. 5 is a view showing a magnetic bearing apparatus according to a second embodiment of the present invention.

Next, a second embodiment of the present invention will be described with reference to FIG. 5. FIG. 5 is a view showing a structural example of the magnetic bearing apparatus according to the second embodiment of the present invention. In the second embodiment, the mechanical structures and the drivers (see FIG. 2) are identical to those of the first embodiment, and the descriptions thereof are omitted. The structures for obtaining the vdam signal, which is an AM modulated signal of the displacement information containing the displacement error information, and the veam signal, which is an AM modulated signal of the displacement error information signal, are also identical to those of the first embodiment.

The exciting currents i1 and i2 are detected by current detectors 217 and 218. The detection signals are added by an adder 208. The resultant signal from the adder 208 is filtered through a bandpass filter 209 whose central frequency is the carrier frequency fc. As a result, a direct current component is removed from the signal, and a vdam signal containing the displacement error information is obtained. The vdam signal is sent to a gain adjustor 210 and adjusted by the gain adjustor 210 to have a desired gain (amplitude), whereby a vdam' signal is obtained. The current ie, supplied from a driver power source 205 to a driver 204, is detected by a current detector 219. This detection signal is filtered through a bandpass filter 211 whose central frequency is the carrier frequency fc. As a result, a fundamental wave component is extracted, and the displacement error information signal veam is obtained. This veam signal is adjusted by a gain adjustor 212 to have a desired gain (amplitude), whereby a veam' signal is obtained. The veam' signal is subtracted from the vdam' signal in a subtractor 213. An output signal from the subtractor 213 is sent to a synchronous-detection-type demodulator 214, where the output signal from the subtractor 213 is demodulated at a predetermined detection timing by the carrier frequency fc from an oscillator 207. As a result, a true displacement information signal vdisp' is obtained.

As shown in FIG. 4, the phase of the veam signal precedes the phase of the vdam signal by 90 degrees. Therefore, the phase of the veam' signal precedes the phase of the vdam' signal by 90 degrees. The signal obtained from the subtractor 213 is a composition signal of the veam' signal and the vdam' signal which have different amplitudes and different phases. Consequently, the signal from the subtractor 213 has an amplitude and a phase differing from those of the veam' signal and the vdam' signal. However, this signal from the subtractor 213 is also a signal obtained by subtracting the displacement error information from the displacement information containing the displacement error information. Therefore, like the first embodiment, the control current ic is supplied while a displacement of a rotor 201 is fixed to zero, and the gain (amplitude) is adjusted by the gain adjustor 210 or the gain adjustor 212 so that the signal vdisp' becomes zero. In this manner, the displacement error information is completely removed.

Figure 6:
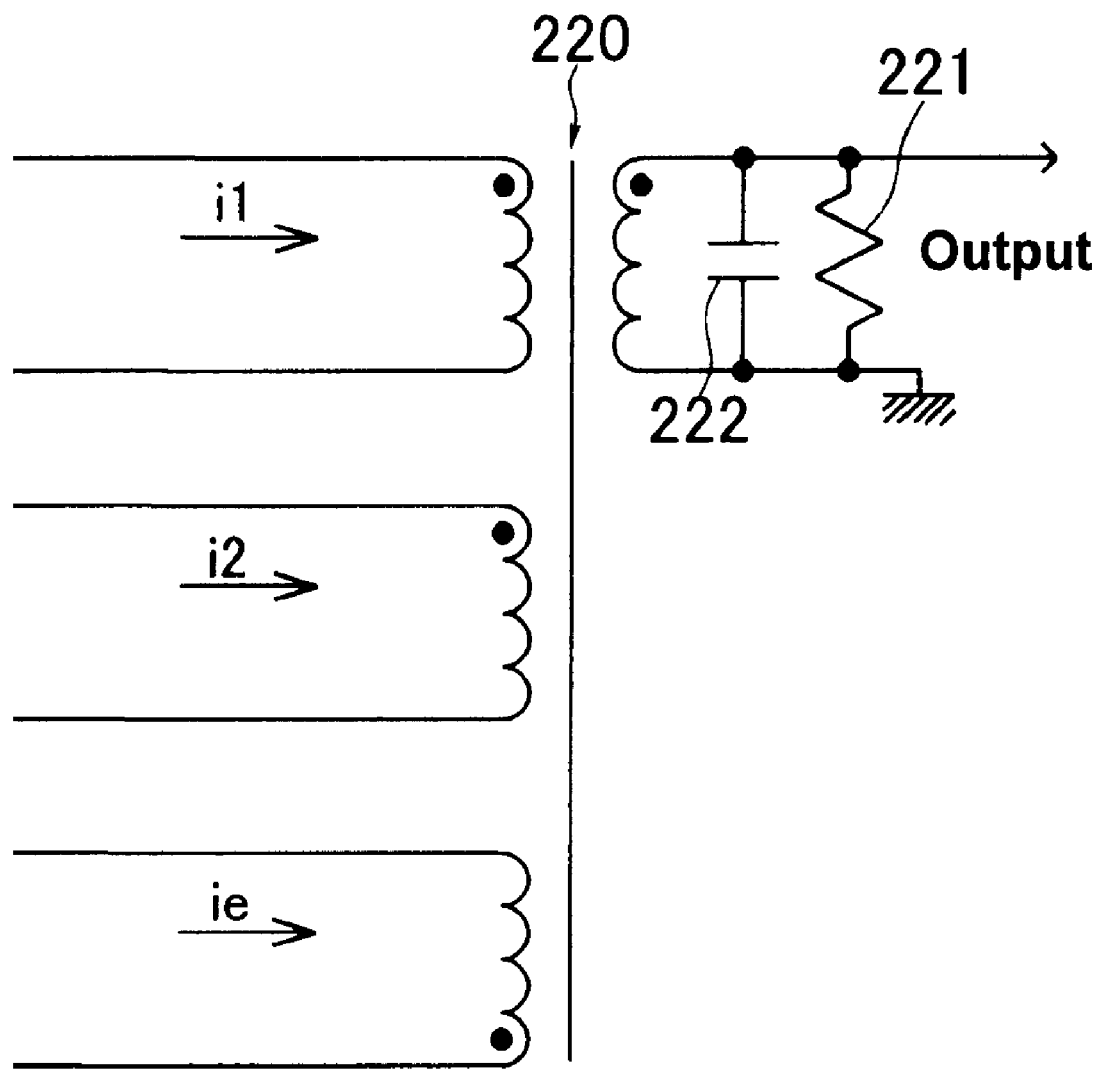
FIG. 6 is a view showing an example in which a function of components enclosed by a dotted line 216 in FIG. 5 is realized by electromagnetic induction.

The displacement signal vdisp', obtained by demodulating the output of the subtractor 213 in the demodulator 214, is fed back and compared with a target levitation position r. A difference signal obtained by the comparison is processed by a compensator 215. The resultant control signal u from the compensator 215 is inputted to the driver 204, so that the rotor 201 is stably supported by the magnetic levitation at a predetermined position between the electromagnet 202 and the electromagnet 203. The synchronous detection timing of the demodulator 214 may be changed (shifted) by a phase shifter or the like so that the signal vdisp' is adjusted to be zero when the displacement of the rotor 201 is zero. As shown in FIG. 6, a transformer 220 may be provided as indicated by a dotted line 216 in FIG. 5. In this case, adding of the exciting currents i1 and i2 detected by the current detectors 217 and 218 and subtracting of the current ie (flowing from the driver power source 205 to the driver 204), detected by the current detector 219, from a resultant value of the addition of the exciting currents i1 and i2 are realized by the electromagnetic induction. Further, a resistor 221 and a condenser 222 may be connected in parallel with an output of the transformer 220 so as to provide a function of a bandpass filter. The gain adjustment by the gain adjustor 210 and the gain adjustor 212 may be performed by a turns ratio between coils of the transformer 220.

Third Embodiment

Figure 7:
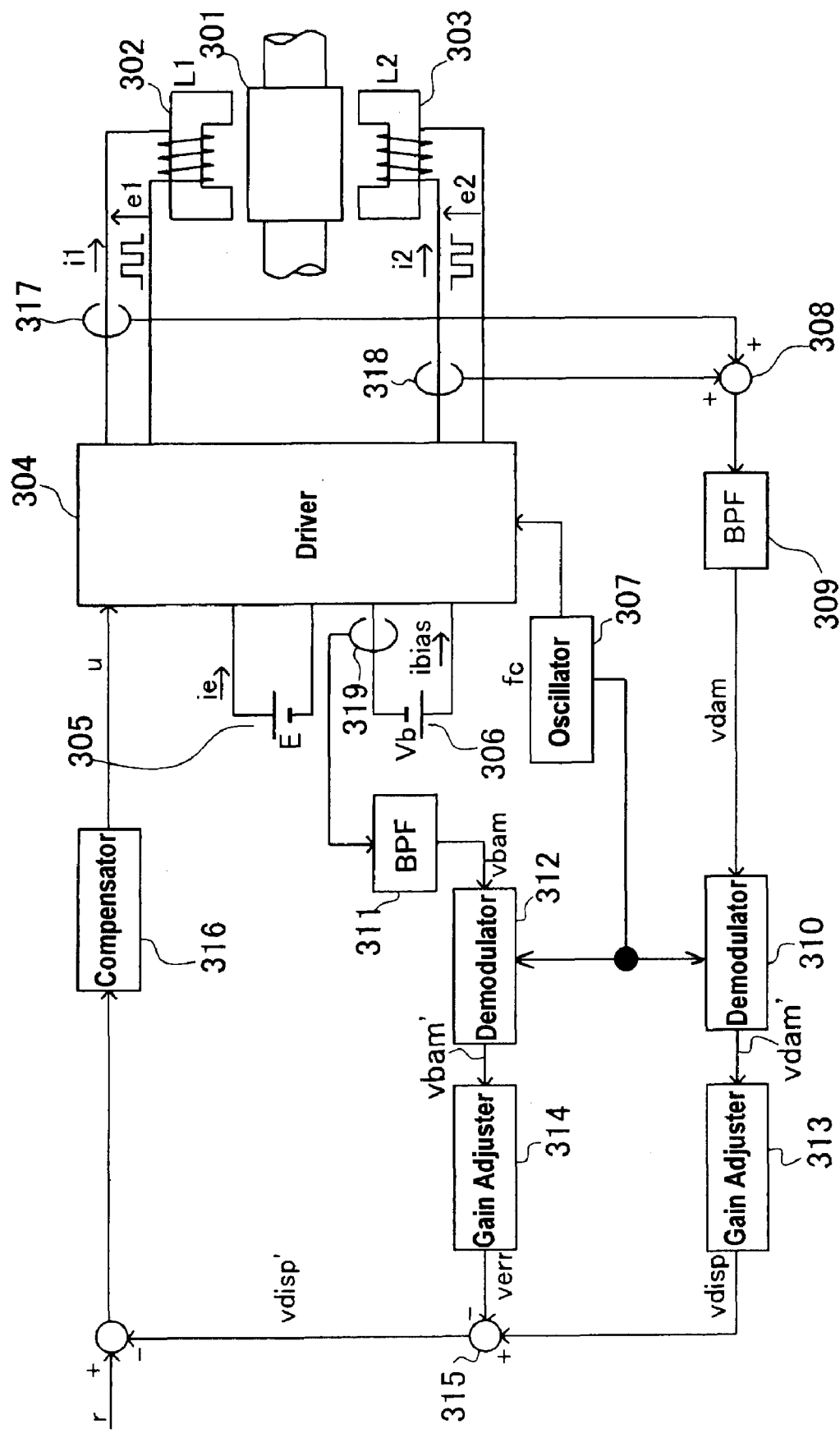
FIG. 7 is a view showing a magnetic bearing apparatus according to a third embodiment of the present invention.

Next, a third embodiment of the present invention will be described with reference to FIG. 7. FIG. 7 is a view showing a structural example of the magnetic bearing apparatus according to the third embodiment of the present invention. The third embodiment is different from the first embodiment in that the displacement error information signal is extracted from a current ibias flowing from a bias power source 306 to a driver 304, instead of the current ie flowing from a driver power source 305 to a driver 304. The mechanical structures and the drivers are identical to those of the first embodiment (see FIGS. 1 and 2).

As shown in FIG. 7, the value of the current ibias, flowing from the bias power source 306 to the driver 304, is i2 when the switching element 21 (SW1) and the switching element 22 (SW2) of the driver 304 are ON and the switching element 23 (SW3) and the switching element 24 (SW4) of the driver 304 are OFF. The switching elements 21-24 are shown in FIG. 2. On the other hand, when the switching element 21 (SW1) and the switching element 22 (SW2) are OFF and the switching element 23 (SW3) and the switching element 24 (SW4) are ON, the value of the current ibias is i1. Since the exciting currents i1 and i2 of the electromagnets 302 and 303 contain the control current ic, the current ibias also contains the information on the control current ic. This current ibias is filtered through a bandpass filter 311 whose center frequency is the carrier frequency fc. As a result, a fundamental wave component is extracted, and a vbam signal, which is an AM modulated signal, is obtained.

When the control current ic is sufficiently larger than the ripple currents ir1 and ir2, an amplitude of the above-mentioned vbam signal is substantially proportional to the control current ic, and a phase of the vbam signal lags behind a phase of the vdam signal by substantially 90 degrees. This vdam signal is detected in the same manner as the first embodiment. When the control current ic is large, the displacement error information has a great influence. The existence of the influence of the displacement error information means that the control current ic is sufficiently larger than the ripple currents ir1 and ir2. Therefore, the vbam signal can effectively be used as the displacement error information. Thus, the current ibias is detected by a current detector 319, and the detection signal is filtered through the bandpass filter 311, whereby the vbam signal is obtained. This vbam signal is demodulated by a demodulator 312 into the vbam' signal as a carrier wave having the same frequency as the carrier frequency fc which is an oscillatory frequency of an oscillator 307. The vbam' signal is sent to a gain adjustor 314 and adjusted to have a desired gain (amplitude), whereby a verr signal is obtained. This verr signal is a displacement error information signal.

In the same manner as the first embodiment, the exciting currents i1 and i2, flowing through the electromagnet 302 and the electromagnet 303, are detected by current detectors 317 and 318. The detection signals are added by an adder 308. The resultant signal from the adder 308 is filtered through a bandpass filter 309 whose central frequency is the carrier frequency fc. As a result, a vdam signal is obtained. The vdam signal is demodulated in a demodulator 310 at a predetermined timing by the carrier frequency fc from the oscillator 307, whereby the vdam' signal is obtained. This vdam' signal is adjusted by a gain adjustor 313 to have a desired gain, whereby the vdisp signal is obtained. The verr signal is subtracted from the vdisp signal by a subtractor 315. As a result, the true displacement signal vdisp' is obtained.

Like the first embodiment, there are no time delay and no difference in frequency characteristic between the vdam signal obtained by the demodulator 310 and the vbam' signal obtained by the demodulator 312. Therefore, the vdam signal and the vbam' signal can be detected at the same time. Accordingly, by the subtraction in the subtractor 315, the true displacement information containing no displacement error information can be obtained without using a complex filter as required in the Japanese laid-open patent publications No. 2004-132537 and No. 2005-196635. The displacement information obtained in this manner is fed back and compared with the target levitation position r. A difference signal obtained by the comparison is processed by a compensator 316. The resultant control signal u from the compensator 316 is inputted to the driver 304, so that a rotor 301 is stably supported by the magnetic levitation at a predetermined position between the electromagnet 302 and the electromagnet 303.

Fourth Embodiment

Figure 8:
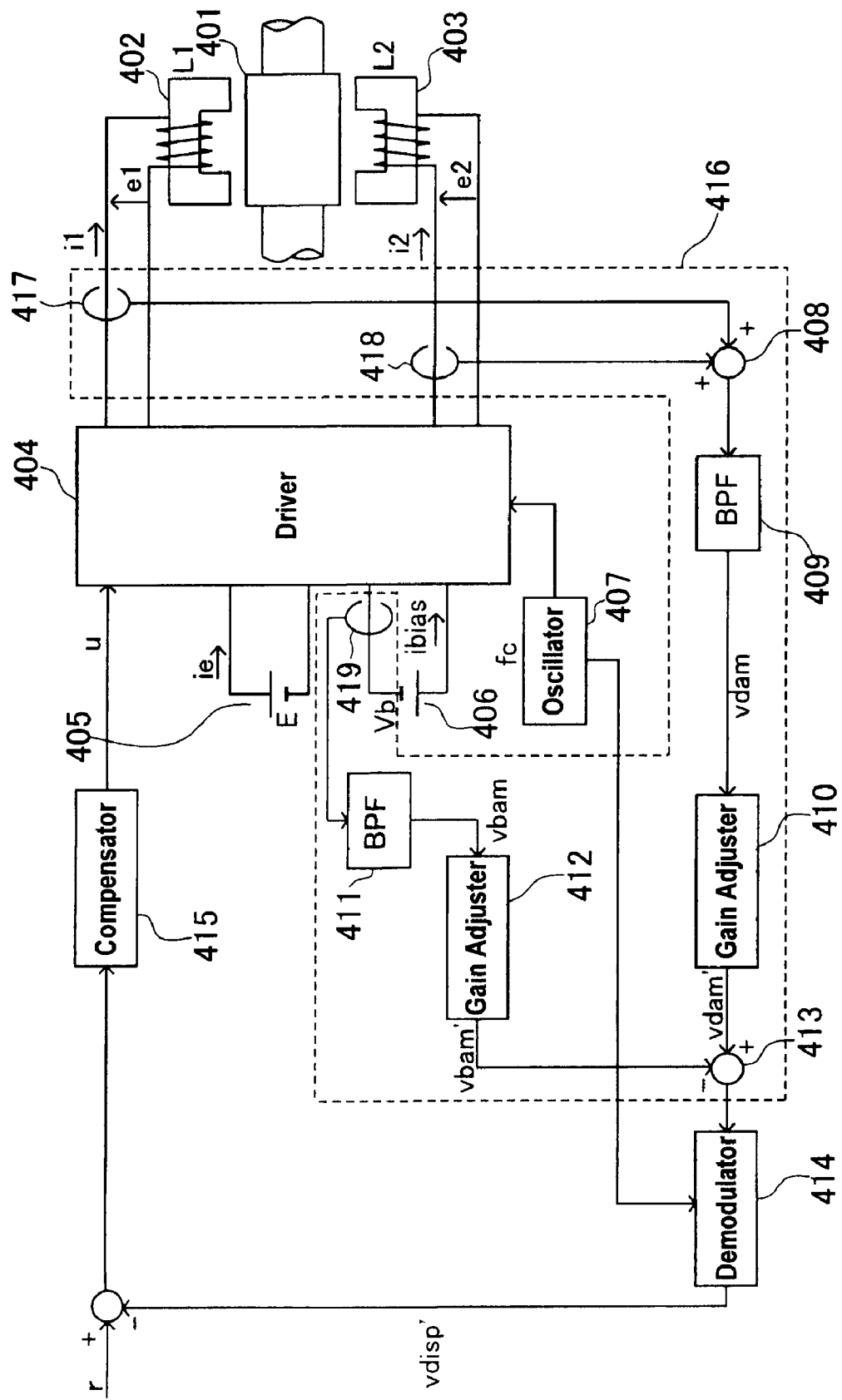
FIG. 8 is a view showing a magnetic bearing apparatus according to a fourth embodiment of the present invention.

Next, a fourth embodiment of the present invention will be described with reference to FIG. 8. FIG. 8 is a view showing a structural example of the magnetic bearing apparatus according to the fourth embodiment of the present invention. The fourth embodiment is different from the second embodiment as shown in FIG. 5 in that the displacement error information signal is extracted from a current ibias flowing from a bias power source 406 to a driver 404, instead of the current ie flowing from the driver power source 205 to the driver 204.

The exciting currents i1 and i2 are detected by current detectors 417 and 418. The detection signals are added by an adder 408. The resultant signal from the adder 408 is filtered through a bandpass filter 409 whose central frequency is the carrier frequency fc. As a result, a direct current component is removed from the signal, and a vdam signal is obtained. The vdam signal is sent to a gain adjustor 410 and adjusted by the gain adjustor 410 to have a desired gain (amplitude), whereby a vdam' signal is obtained. The current ibias, supplied from the bias power source 406 to the driver 404, is detected by a current detector 419. This detection signal is filtered through a bandpass filter 411 whose central frequency is the carrier frequency fc. As a result, a fundamental wave component is extracted, and a vbam is obtained. This vbam signal is adjusted by a gain adjustor 412 to have a desired gain (amplitude), whereby a vbam' signal is obtained. The vbam' signal is subtracted from the vdam' signal by a subtractor 413. An output signal from the subtractor 413 is sent to a synchronous-detection-type demodulator 414, where the output signal from the subtractor 413 is demodulated at a predetermined detection timing. As a result, a displacement information signal vdisp' is obtained.

The displacement signal vdisp', obtained by demodulating the output of the subtractor 413 in the demodulator 414, is fed back, so that a rotor 401 is stably supported by the magnetic levitation. Specifically, the displacement error information is detected in the same manner as in the third embodiment, and the displacement signal vdisp' obtained in the same manner as in the second embodiment is fed back and compared with the target levitation position r. A difference signal obtained by the comparison is processed by a compensator 415. The resultant control signal u from the compensator 415 is inputted to the driver 404, so that the rotor 401 is stably supported by the magnetic levitation at a predetermined position between the electromagnet 402 and the electromagnet 403.

Figure 9:
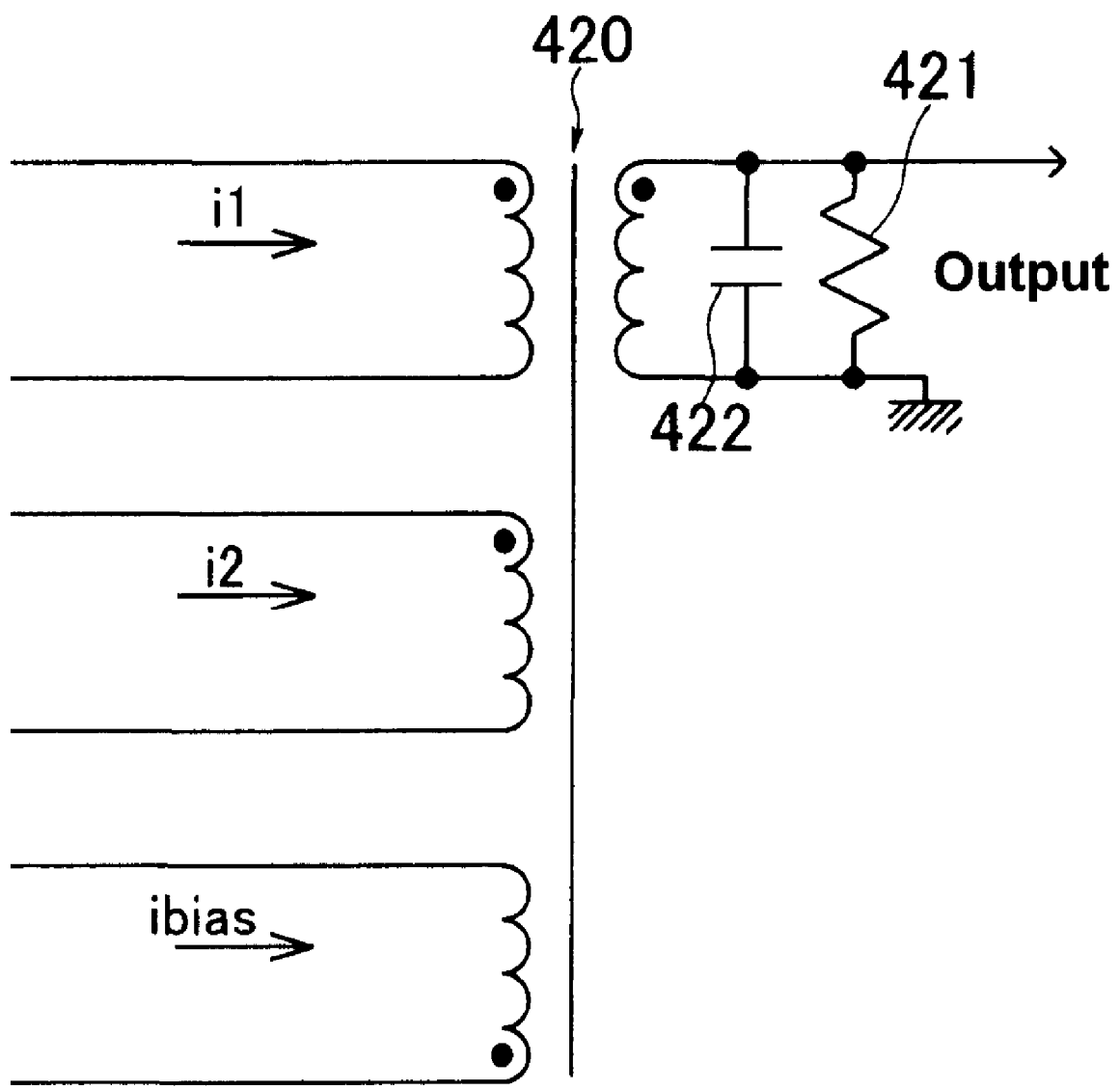
FIG. 9 is a view showing an example in which a function of components enclosed by a dotted line 416 in FIG. 8 is realized by electromagnetic induction.
Figure 10:
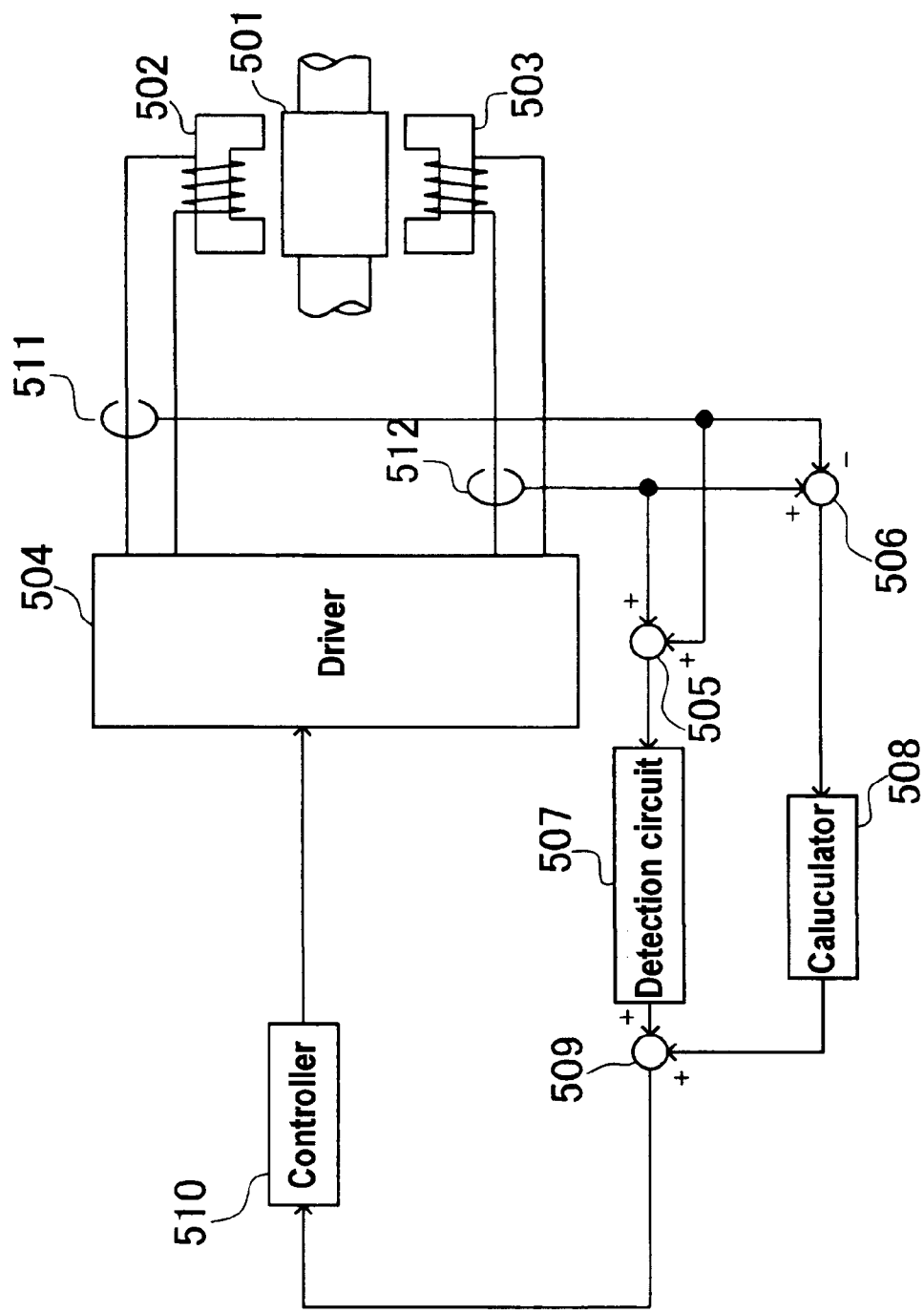
FIG. 10 is a view showing a structural example of a conventional magnetic bearing apparatus.
Figure 11:
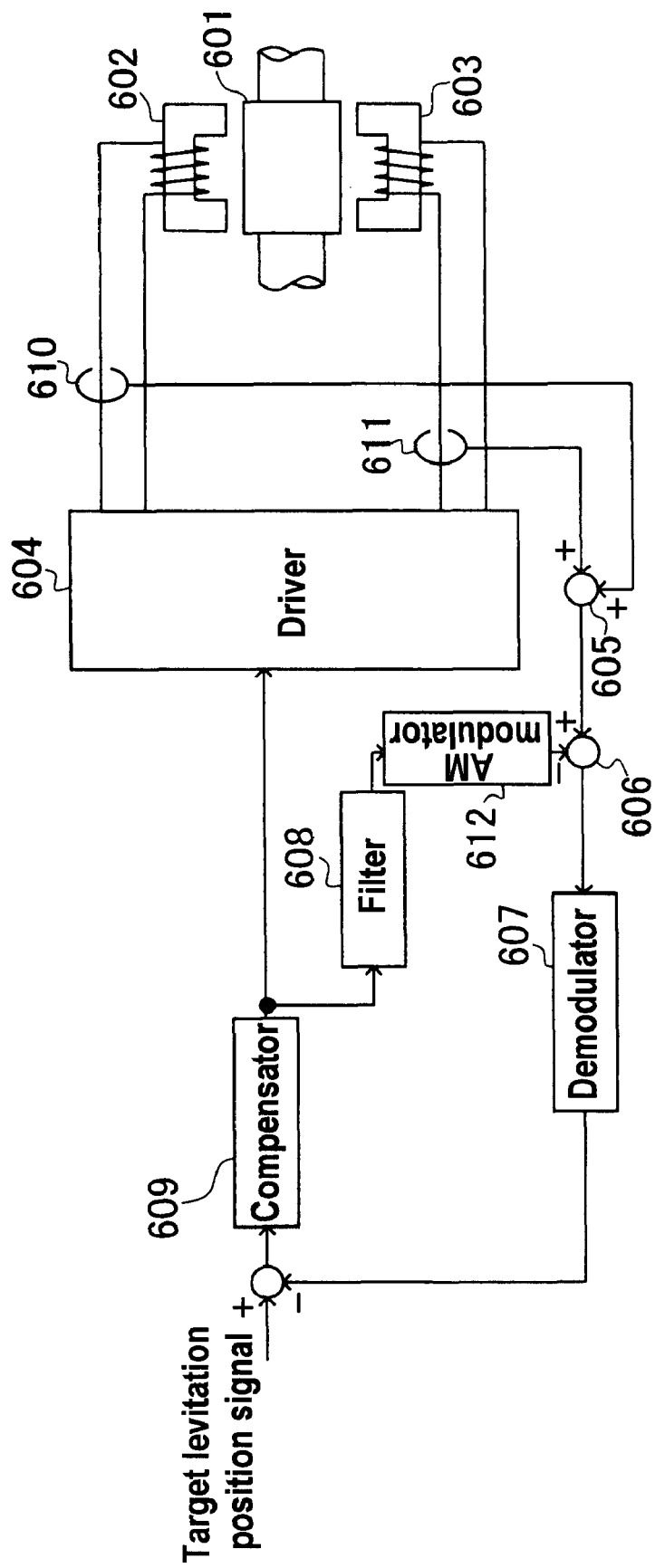
FIG. 11 is a view showing another structural example of a conventional magnetic bearing apparatus.

As shown in FIG. 9, a transformer 420 may be provided as indicated by a dotted line 416 in FIG. 8. In this case, adding of the exciting currents i1 and i2 detected by the current detectors 417 and 418 and subtracting of the current ibias, detected by the current detector 419, from a resultant value of the addition of the exciting currents i1 and i2 are realized by the electromagnetic induction. The current ibias, flowing from the driver power source 406 to the driver 404, is smaller than the current ie flowing through a driver power source 405. As a result, the transformer 420 is unlikely to reach magnetic saturation. The transformer 420 as shown in FIG. 9 can be more compact than the transformer 220 as shown in FIG. 6 according to the second embodiment. A resistor 421 and a condenser 422 may be connected in parallel with an output of the transformer 420 so as to provide a function of a bandpass filter. The gain adjustment by the gain adjustor 410 and the gain adjustor 412 may be performed by a turns ratio between coils of the transformer 420.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims and equivalents.

What is claimed is:

1. A magnetic bearing apparatus having electromagnets for rotatably supporting a rotor at a predetermined position by a magnet levitation, while obtaining a displacement information on the rotor based on a change in impedances of said electromagnets, said magnetic bearing apparatus comprising:
    a PWM driver configured to supply exciting currents to said electromagnets, said PWM driver being driven at a predetermined carrier frequency;
    a driver power source configured to drive said PWM driver; and
    a displacement error signal removing section configured to extract a displacement error signal of the displacement information from a current flowing through said driver power source and to remove the displacement error signal from the displacement information.

2. The magnetic bearing apparatus according to claim 1, wherein said displacement error signal removing section includes
    a first demodulator configured to demodulate ripple current components of the exciting currents into AM modulated waves each having a frequency equal to a carrier frequency of said PWM driver,
    a second demodulator configured to demodulate a current component, flowing through said driver power source, into an AM modulated wave having a frequency equal to the carrier frequency of said PWM driver,
    a first gain adjustor configured to adjust gains of the ripple current components before or after said first demodulator demodulates the ripple current components,
    a second gain adjustor configured to adjust a gain of the current component flowing through said driver power source before or after said second demodulator demodulates the current component, and a subtractor configured to subtract the current component, obtained through said second demodulator and said second gain adjustor, from the ripple current components obtained through said first demodulator and said first gain adjustor.

3. The magnetic bearing apparatus according to claim 2, wherein:
said first demodulator and said second demodulator are of synchronous detection type; and
adjustment of the gains by said first gain adjustor and said second gains adjustor are performed by shifting a timing of synchronous detection.

4. The magnetic bearing apparatus according to claim 2, wherein:
said first gain adjustor and said second gain adjustor are configured to adjust the gains of the ripple current components and the gain of the current component, flowing through said driver power source, such that an output of said subtractor is zero when the displacement of the rotor is zero.

5. The magnetic bearing apparatus according to claim 1, wherein said displacement error signal removing section includes
a first gain adjustor configured to adjust gains of ripple current components of the exciting currents,
a second gain adjustor configured to adjust a gain of the current component flowing through said driver power source,
a subtractor configured to subtract the current component, obtained from said second gain adjustor, from the ripple current components obtained from said first gain adjustor, and
a demodulator configured to demodulate a signal, obtained from said subtractor, into an AM modulated wave having a frequency equal to a carrier frequency of said PWM driver.

6. The magnetic bearing apparatus according to claim 5, wherein:
said demodulator is of synchronous detection type; and
a timing of synchronous detection of said demodulator is shifted such that an output of said subtractor is zero when the displacement of the rotor is zero.

7. The magnetic bearing apparatus according to claim 1, wherein said displacement error signal removing section includes
a transformer having a first coil into which ripple current components of the exciting currents are inputted and a second coil into which a current component, flowing through said driver power source, is inputted, and
a demodulator configured to demodulate an output signal from said transformer into an AM modulated wave having a frequency equal to a carrier frequency of said PWM driver, and
wherein said transformer is configured to adjust gains of the ripple current components and a gain of the current component, flowing through said driver power source, by adjusting a turns ratio of said first coil to said second coil and further configured to subtract the current component, flowing through said driver power source, from the ripple current components by electromagnetic induction.

8. The magnetic bearing apparatus according to claim 7, wherein:
said demodulator is of synchronous detection type; and
a timing of synchronous detection of said demodulator is shifted such that an output of said subtractor is zero when the displacement of the rotor is zero.

9. A magnetic bearing apparatus having electromagnets for rotatably supporting a rotor at a predetermined position by a magnet levitation, while obtaining a displacement information on the rotor based on a change in impedances of said electromagnets, said magnetic bearing apparatus comprising:
a PWM driver configured to supply exciting currents to said electromagnets, said PWM driver being driven at a predetermined carrier frequency and having a bias power source configured to supply a bias current to said electromagnets for linearizing a relationship between the exciting currents supplied to the electromagnets and magnetic forces exerted on the rotor; and
a displacement error signal removing section configured to extract a displacement error signal of the displacement information from a current flowing through said bias power source and to remove the displacement error signal from the displacement information.

10. The magnetic bearing apparatus according to claim 9, wherein said displacement error signal removing section includes
a first demodulator configured to demodulate ripple current components of the exciting currents into AM modulated waves each having a frequency equal to a carrier frequency of said PWM driver,
a second demodulator configured to demodulate a current component, flowing through said bias power source, into an AM modulated wave having a frequency equal to the carrier frequency of said PWM driver,
a first gain adjustor configured to adjust gains of the ripple current components before or after said first demodulator demodulates the ripple current components,
a second gain adjustor configured to adjust a gain of the current component flowing through said bias power source before or after said second demodulator demodulates the current component, and
a subtractor configured to subtract the current component obtained through said second demodulator and said second gain adjustor from the ripple current components obtained through said first demodulator and said first gain adjustor.

11. The magnetic bearing apparatus according to claim 10, wherein:
said first demodulator and said second demodulator are of synchronous detection type; and
adjustment of the gains by said first gain adjustor and said second gains adjustor are performed by shifting a timing of synchronous detection.

12. The magnetic bearing apparatus according to claim 10, wherein:
said first gain adjustor and said second gain adjustor are configured to adjust the gains of the ripple current components and the gain of the current component, flowing through said bias power source, such that an output of said subtractor is zero when the displacement of the rotor is zero.

13. The magnetic bearing apparatus according to claim 9, wherein said displacement error signal removing section includes
a first gain adjustor configured to adjust gains of ripple current components of the exciting currents,
a second gain adjustor configured to adjust a gain of the current component flowing through said bias power source,
a subtractor configured to subtract the current component, obtained from said second gain adjustor, from the ripple current components obtained from said first gain adjustor, and a demodulator configured to demodulate a signal, obtained from said subtractor, into an AM modulated wave having a frequency equal to a carrier frequency of said PWM driver.

14. The magnetic bearing apparatus according to claim 13, wherein:

said demodulator is of synchronous detection type; and a timing of synchronous detection of said demodulator is shifted such that an output of said subtractor is zero when the displacement of the rotor is zero.

15. The magnetic bearing apparatus according to claim 9, wherein said displacement error signal removing section includes a transformer having a first coil into which ripple current components of the exciting currents are inputted and a second coil into which a current component, flowing through said bias power source, is inputted, and a demodulator configured to demodulate an output signal from said transformer into an AM modulated wave having a frequency equal to a carrier frequency of said PWM driver, and wherein said transformer is configured to adjust gains of the ripple current components and a gain of the current component, flowing through said bias power source, by adjusting a turns ratio of said first coil to said second coil and further configured to subtract the current component, flowing through said bias power source, from the ripple current components by electromagnetic induction.

16. The magnetic bearing apparatus according to claim 15, wherein:

said demodulator is of synchronous detection type; and a timing of synchronous detection of said demodulator is shifted such that an output of said subtractor is zero when the displacement of the rotor is zero.

* * * * *